(12) United States Patent
Collins et al.

(10) Patent No.: US 8,392,586 B2
(45) Date of Patent: Mar. 5, 2013

(54) METHOD AND APPARATUS TO MANAGE TRANSACTIONS AT A NETWORK STORAGE DEVICE

(75) Inventors: Kevin Collins, Fort Collins, CO (US); Ronald E. Poppen-Chambers, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2390 days.

(21) Appl. No.: 09/858,080

(22) Filed: May 15, 2001

(65) Prior Publication Data

US 2002/0188733 A1    Dec. 12, 2002

(51) Int. Cl.
  *G06F 15/16*    (2006.01)
(52) U.S. Cl. ...................................... 709/229
(58) Field of Classification Search .................. 709/229, 709/207, 203, 217, 218, 240; 711/114
  See application file for complete search history.

(56) References Cited

U.S. PATENT DOCUMENTS

| | | | | |
|---|---|---|---|---|
| 5,592,612 | A * | 1/1997 | Birk | 714/6.24 |
| 6,157,963 | A * | 12/2000 | Courtright et al. | 710/5 |
| 6,249,291 | B1 * | 6/2001 | Popp et al. | 345/473 |
| 6,289,383 | B1 * | 9/2001 | Rhine | 709/227 |
| 6,330,572 | B1 * | 12/2001 | Sitka | 707/608 |
| 6,332,140 | B1 * | 12/2001 | Rhine | 1/1 |
| 6,449,688 | B1 * | 9/2002 | Peters et al. | 711/112 |
| 6,453,356 | B1 * | 9/2002 | Sheard et al. | 709/231 |
| 6,466,980 | B1 * | 10/2002 | Lumelsky et al. | 709/226 |
| 6,487,594 | B1 * | 11/2002 | Bahlmann | 709/225 |
| 6,571,354 | B1 * | 5/2003 | Parks et al. | 714/6.32 |
| 6,578,076 | B1 * | 6/2003 | Putzolu | 709/223 |
| 6,597,956 | B1 * | 7/2003 | Aziz et al. | 700/3 |
| 6,601,101 | B1 * | 7/2003 | Lee et al. | 709/227 |
| 6,633,835 | B1 * | 10/2003 | Moran et al. | 702/190 |
| 6,640,278 | B1 * | 10/2003 | Nolan et al. | 711/6 |
| 6,654,814 | B1 * | 11/2003 | Britton et al. | 709/246 |
| 6,654,830 | B1 * | 11/2003 | Taylor et al. | 710/74 |
| 6,697,924 | B2 * | 2/2004 | Swank | 711/163 |
| 6,779,016 | B1 * | 8/2004 | Aziz et al. | 709/201 |
| 6,802,064 | B1 * | 10/2004 | Yao et al. | 718/102 |
| 6,816,903 | B1 * | 11/2004 | Rakoshitz et al. | 709/226 |
| 6,839,766 | B1 * | 1/2005 | Parnafes et al. | 709/232 |
| 6,912,627 | B2 * | 6/2005 | Matsunami et al. | 711/154 |
| 6,941,465 | B1 * | 9/2005 | Palekar et al. | 726/1 |
| 6,948,060 | B1 * | 9/2005 | Ramanathan | 713/153 |
| 6,957,433 | B2 * | 10/2005 | Umberger et al. | 718/103 |
| 6,988,133 | B1 * | 1/2006 | Zavalkovsky et al. | 709/223 |
| 7,006,512 | B2 * | 2/2006 | Yang et al. | 370/413 |
| 7,023,825 | B1 * | 4/2006 | Haumont et al. | 370/338 |

(Continued)

OTHER PUBLICATIONS

Mahon, et al., Requirements for a Policy Management System, draft-ietf-policy-req-01.txt (http://www.ietf.org/proceedings/99nov/I-D/draft-ietf-policy-req-01.txt), Internet Draft, IETF, 1999, p. 69.*

(Continued)

*Primary Examiner* — Alicia Baturay

(57) ABSTRACT

An apparatus and method for managing a number of transactions at a network storage device (e.g., a NAS device). The network storage device is identified on the network and a usage policy is generated. The usage policy defines a number of rules comprising conditions and corresponding priorities. A transaction preferably comprises meta data associated therewith. The meta data is read from the transaction and compared to the conditions of the rules defined in the usage policy. The transactions are prioritized at the network storage device based on the rules.

12 Claims, 6 Drawing Sheets

U.S. PATENT DOCUMENTS

| | | | |
|---|---|---|---|
| 7,039,053 B1* | 5/2006 | Freed et al. | 370/392 |
| 7,046,261 B2* | 5/2006 | Popp et al. | 345/676 |
| 7,050,396 B1* | 5/2006 | Cohen et al. | 370/235 |
| 7,185,073 B1* | 2/2007 | Gai et al. | 709/221 |
| 7,191,190 B2* | 3/2007 | Debique et al. | 1/1 |
| 7,346,677 B1* | 3/2008 | Mohaban et al. | 709/224 |
| 7,428,583 B1* | 9/2008 | Lortz et al. | 709/223 |
| 2001/0023453 A1* | 9/2001 | Sundqvist | 709/232 |
| 2001/0039576 A1* | 11/2001 | Kanada | 709/223 |
| 2002/0004816 A1* | 1/2002 | Vange et al. | 709/202 |
| 2002/0007374 A1* | 1/2002 | Marks et al. | 707/513 |
| 2002/0007376 A1* | 1/2002 | Popp et al. | 707/513 |
| 2002/0010798 A1* | 1/2002 | Ben-Shaul et al. | 709/247 |
| 2002/0049778 A1* | 4/2002 | Bell et al. | 707/200 |
| 2002/0087694 A1* | 7/2002 | Daoud et al. | 709/226 |
| 2002/0089929 A1* | 7/2002 | Tallegas et al. | 370/230 |
| 2002/0099914 A1* | 7/2002 | Matsunami et al. | 711/154 |
| 2002/0107949 A1* | 8/2002 | Rawson, III | 709/223 |
| 2002/0107971 A1* | 8/2002 | Bailey et al. | 709/231 |
| 2002/0107989 A1* | 8/2002 | Johnson et al. | 709/250 |
| 2002/0133539 A1* | 9/2002 | Monday | 709/203 |
| 2002/0141427 A1* | 10/2002 | McAlpine | 370/413 |
| 2002/0143948 A1* | 10/2002 | Maher et al. | 709/226 |
| 2003/0097443 A1* | 5/2003 | Gillett et al. | 709/225 |
| 2003/0126265 A1* | 7/2003 | Aziz et al. | 709/227 |
| 2003/0154112 A1* | 8/2003 | Neiman et al. | 705/5 |
| 2003/0163609 A1* | 8/2003 | Abdo et al. | 710/5 |
| 2003/0236837 A1* | 12/2003 | Johnson et al. | 709/205 |
| 2003/0236861 A1* | 12/2003 | Johnson et al. | 709/219 |
| 2003/0236919 A1* | 12/2003 | Johnson et al. | 709/251 |
| 2004/0109410 A1* | 6/2004 | Chase et al. | 370/229 |
| 2004/0205206 A1* | 10/2004 | Naik et al. | 709/230 |
| 2006/0095686 A1* | 5/2006 | Miller et al. | 711/151 |

OTHER PUBLICATIONS

Gibson, Garth A. and Van Meter, Rodney. Network attached storage architecture Nov. 2000 Communications of the ACM, vol. 43 Issue 11, p. 42.*

Comer, Douglas E., Internetworking with TCP/IP, vol. 1: Principles, Protocols, and Architecture, 3rd Edition. 1995. Prentice-Hall, Inc., pp. 92-93.*

Purimetla, B., et al. Priority assignment in real-time active databases. Sep. 28-30, 1994. Proceedings of the Third International Conference on Parallel and Distributed Information Systems, 1994. pp. 176-184.*

* cited by examiner

METHOD AND APPARATUS TO MANAGE TRANSACTIONS AT A NETWORK STORAGE DEVICE

FIELD OF THE INVENTION

The invention pertains to managing a network storage device and more particularly to prioritizing transactions at the network storage device.

BACKGROUND OF THE INVENTION

Computer readable data is commonly stored on devices connected over a network to centralize access to the data. Until recently, use of the storage device was limited by the speed of the network connection. However, as network connections have become faster, the focus has shifted to increasing the speed and efficiency of the network storage device itself.

Network storage devices come in many forms. For example, a direct attached storage (DAS) device is attached to the network through a server. Use of the DAS device is therefore limited by the speed of the server. Network attached storage (NAS) devices improve the performance and efficiency of storage on the network by attaching directly to the network and making use of the NAS device independent of the server speed. That is, data is transferred directly between the NAS device and clients on the network via industry standard network protocols (e.g., TCP/IP). However, various clients on the network may require use of the same NAS device, requiring that access to the NAS device be managed to optimize the speed and efficiency thereof.

Use of the NAS device may be on a first-in, first-out (FIFO) basis. For example, two or more transactions may be received at the NAS device. Where the first transaction is received first in time, the first transaction is processed by the NAS device ahead of the second transaction. However, use of the NAS device on a FIFO basis is not always efficient. For example, the first transaction may be to write backup data to the storage device while the second transaction may be a request to view a video clip stored on the NAS device. Thus, writing the backup data will take priority over retrieving the video clip, thereby interrupting transmission of the video clip and causing it to appear shaky as it is viewed by the second client.

Alternatively, multiple NAS devices on the network may each be designated for exclusive use by particular groups of users, applications, etc. For example, one NAS device may be designated for data backup, while the other NAS devices may each be designated for particular projects. Or for example, each NAS device may be designated for exclusive use by individual users or groups of users. However, such an approach can become costly, such as where additional storage devices must be purchased for each new project. In addition, such an approach may make inefficient use of the available NAS devices. That is, transactions at one or more NAS devices may be intermittent or non-existent at times (e.g., where data is only backed-up during off-peak hours), while transactions at other storage devices may be continuous during those same times (e.g., where stored data is repeatedly accessed for a particular project). As such, one or more NAS devices may be idle while at the same time, another NAS device experiences very high demand.

Therefore, a need exists to manage the NAS devices at the device level. Where there are multiple NAS devices on a network, a need also exists to centralize management of the NAS devices while maintaining control at the device level.

SUMMARY OF THE INVENTION

The inventors have devised apparatus and methods for managing a network storage device (e.g., a network attached storage (NAS) device, a storage area network (SAN), etc.), at the network storage device itself. Preferably a usage policy (or policies) is centrally generated at a policy management server and distributed to one or more network storage devices to prioritize transactions at the network storage device.

An embodiment of the apparatus for managing a network storage device is preferably embodied in computer readable program code stored on computer readable storage medium. Preferably, the storage medium is contained within the network storage device. A usage policy is also stored on the computer readable storage medium. The computer readable program code (e.g., a software agent) may comprise program code for prioritizing a transaction at the network storage device based on the usage policy. For example, incoming transactions may be ordered among other transactions in a queue for access to storage at the network storage device. Or for example, outgoing transactions may be assigned a priority for handling at the storage device and/or elsewhere on the network. Preferably, the usage policy includes a number of rules which define a number of priorities based on meta data associated with the transaction, wherein the program code assigns one of the priorities to the transaction when the transaction satisfies at least one of the rules. Also preferably, the transaction is a packetized signal including at least one data packet and at least one meta data packet, wherein the program code reads the at least one meta data packet and assigns a priority for ordering the transaction among other transactions based on the assigned priority. In addition, the usage policy preferably also includes a number of default rules.

Another embodiment of the apparatus for managing a network storage device is also preferably embodied in computer readable program code residing in computer readable storage medium. Preferably, the storage medium at which the program code resides is at a policy management server and program code is provided for distributing the usage policy to the network storage device. The computer readable program code may comprise program code for defining a usage policy for prioritizing a transaction at the network storage device. Preferably, a setup utility is also provided for installing the program code for defining a usage policy on a policy management server, and for installing the program code for prioritizing the transaction at the network storage device.

An embodiment of the method for managing access to a network storage device may comprise: receiving a transaction at the network storage device; and prioritizing the transaction at the network storage device based at least in part on a usage policy. For example, prioritizing the transaction may comprise ordering the transaction among other transactions in a queue for access to storage at the network storage device. Or for example, prioritizing the transaction may comprise assigning a priority to outgoing transactions for handling at the storage device and/or elsewhere on the network. In addition, the method may further comprise: reading meta data from the transaction; and comparing the meta data to a number of rules defined in the usage policy, wherein prioritizing the transaction is based on the meta data satisfying at least one of the number of rules.

Another embodiment of the method for managing access to a network storage device may comprise: generating a usage policy for the network storage device; and distributing the usage policy to the network storage device for prioritizing transactions at the network storage device.

As such, the apparatus and methods of the invention prioritize transactions at the device level. Prioritizing transactions as such increases the efficiency of the storage device by processing higher priority transactions before lower priority transactions are processed (e.g., based on a queue managed at the storage device according to the usage policy; when routed elsewhere on the network; etc.). In addition, the apparatus and method of the invention centralize management of multiple storage devices on the network by generating the usage policies for each storage device at the policy management server and distributing them to the individual storage devices.

These and other important advantages of the present invention will be further explained in, or will become apparent from, the accompanying description, drawings and claims.

BRIEF DESCRIPTION OF THE DRAWINGS

Illustrative and presently preferred embodiments of the invention are illustrated in the drawings in which.

DESCRIPTION OF THE PREFERRED EMBODIMENT

Figure 1:
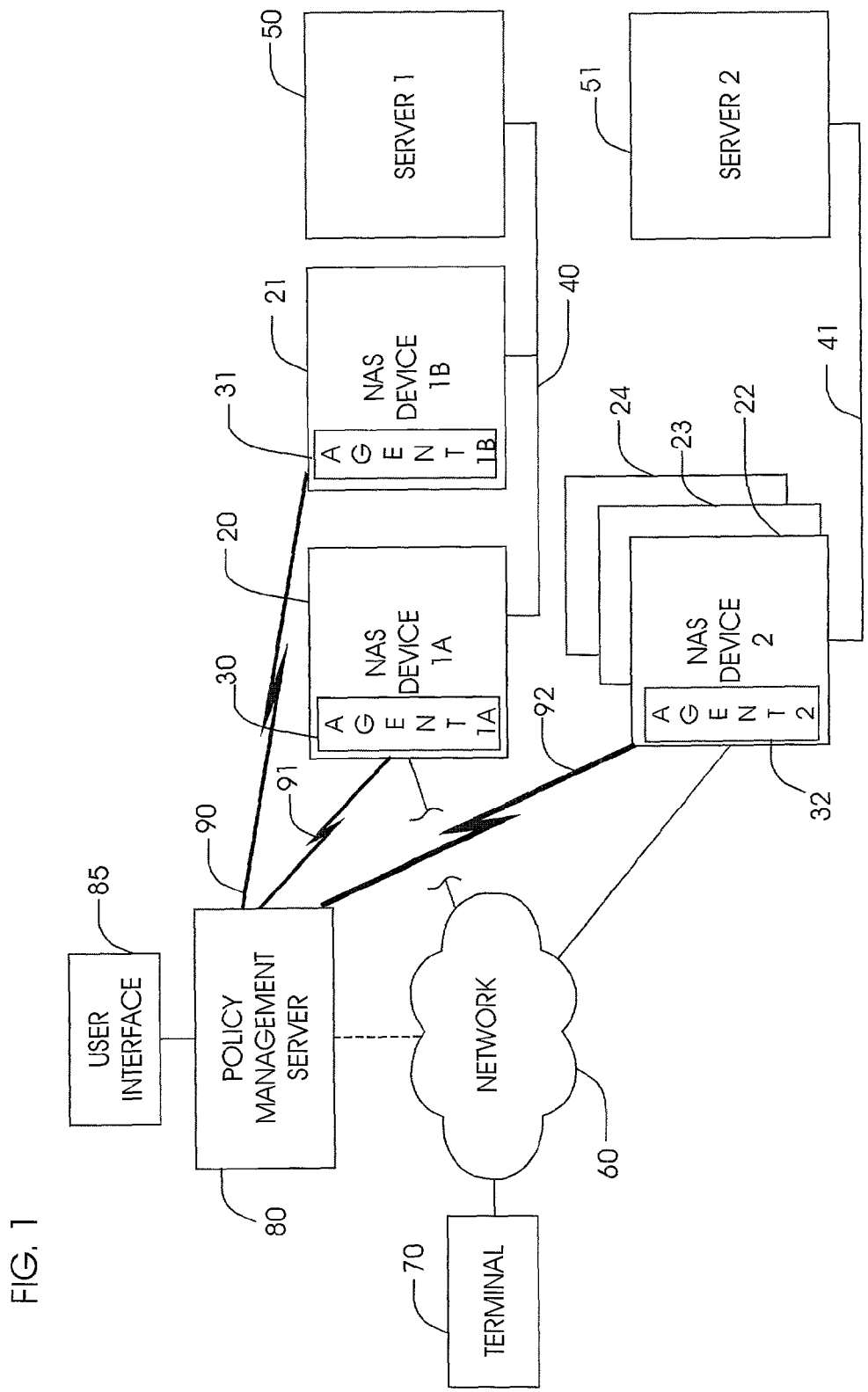
FIG. 1 is a high level diagram showing the components of a storage management apparatus.

An apparatus for managing a number of storage devices (e.g., NAS devices 20-24) is shown in FIG. 1. The apparatus may comprise a local area network (LAN) 40, 41 having the NAS device 20 and a server 50, 51 linked thereon. The NAS device 20 may be an individual NAS device (e.g., 20,21), or may also include associated NAS devices (e.g., 22-24). According to the teachings of the invention, the NAS device 20 includes computer readable program code 30 (e.g., software agents 30-32 stored in memory or otherwise residing at the NAS device 20). The agent 30 can be, for example, integral with the operating system of the NAS device 20, an add-on to the operating system, etc. Preferably, a single agent (e.g., 32) manages each of the multiple associated NAS devices (e.g., 22-24). However, in another embodiment each of the multiple associated NAS devices (e.g., 22-24) may have a separate agent (not shown).

The NAS device 20 may be connected over a network such as the Internet, an Intranet, etc. (e.g., wide area network (WAN) 60, LAN 40, 41, etc.) to another network and/or to a client terminal 70. In addition, a policy management server 80 for generating a usage policy 250 (FIG. 3) may be linked to the NAS device 20 over the WAN 60 or over the LAN 40. Preferably, the policy management server 80 includes a user interface 85 (e.g., a graphical user interface or GUI) that may be used to define access parameters in the usage policy 250. The usage policy 250 is then transmitted 90-92 (e.g., using transmission control protocol (TCP) as its transport protocol over the WAN 60 and/or LAN 40, 41) to the agent 30 residing at the NAS device 20 using a standard policy protocol (e.g., Common Open Policy Service (COPS)).

The policy management server 80 and the terminal 70 can be any suitable computer (e.g., having an INTEL PENTIUM® processor) such as a desktop personal computer, a laptop, a handheld computer (e.g., a PALM PILOT®), a wireless device, etc. However, the policy management server 80 need not be exclusively designated for generating usage policies 250 and can in some embodiments be used as a terminal 70, and vice versa. Likewise, the storage device is preferably a packet-based NAS device 20, however, it can be any suitable network storage device now known (e.g., a DAS with associated server-based agent, Fibre Channel Storage Area Network (SAN), etc.), or a device later developed.

It is understood that the apparatus shown in FIG. 1 is merely illustrative of the invention, and other embodiments are intended as being within the scope of the invention. For example, any number of terminals 70, policy management servers 80, and NAS devices 20 can be linked to one another over any number of networks. In addition, the policy management server 80, the terminal 70, and/or the NAS device 20 may be connected to one another in any suitable manner. For example, the NAS device 20 may be connected directly to the WAN 60. Or for example, the terminal 70 and/or the policy management server can be linked to the storage device over the LAN 40. Also in addition, the policy management server 80, the terminal 70 and the NAS device 20 can be linked to one another over any suitable network, remote or otherwise (e.g., digital subscriber line (DSL), dial-in via a public switched telephone network (PSTN) or cellular telephone network, via satellite, etc.). Furthermore, any suitable protocols can be used to communicate therebetween (e.g., for communicating the usage policy 250 from the policy management server 80 to the agent 30).

It is further understood that the NAS device 20 can be partitioned in any suitable manner. For example, the NAS device 20 may include directories and/or subdirectories created thereon. Or for example, the NAS device 20 may even be partitioned (e.g., similar to hard disk drive partitions on a personal computer (PC)). Indeed, access to particular partitions of the NAS device 20 may be restricted (e.g., requiring a passcode for access thereto). In addition, multiple associated NAS devices (e.g., 22-24 in FIG. 1) can each be individually designated for distinct transactions and managed by a single agent (e.g., 32), or an agent may reside at each associated NAS device (not shown) and have for example, a master-slave relation to one another.

Figure 2:
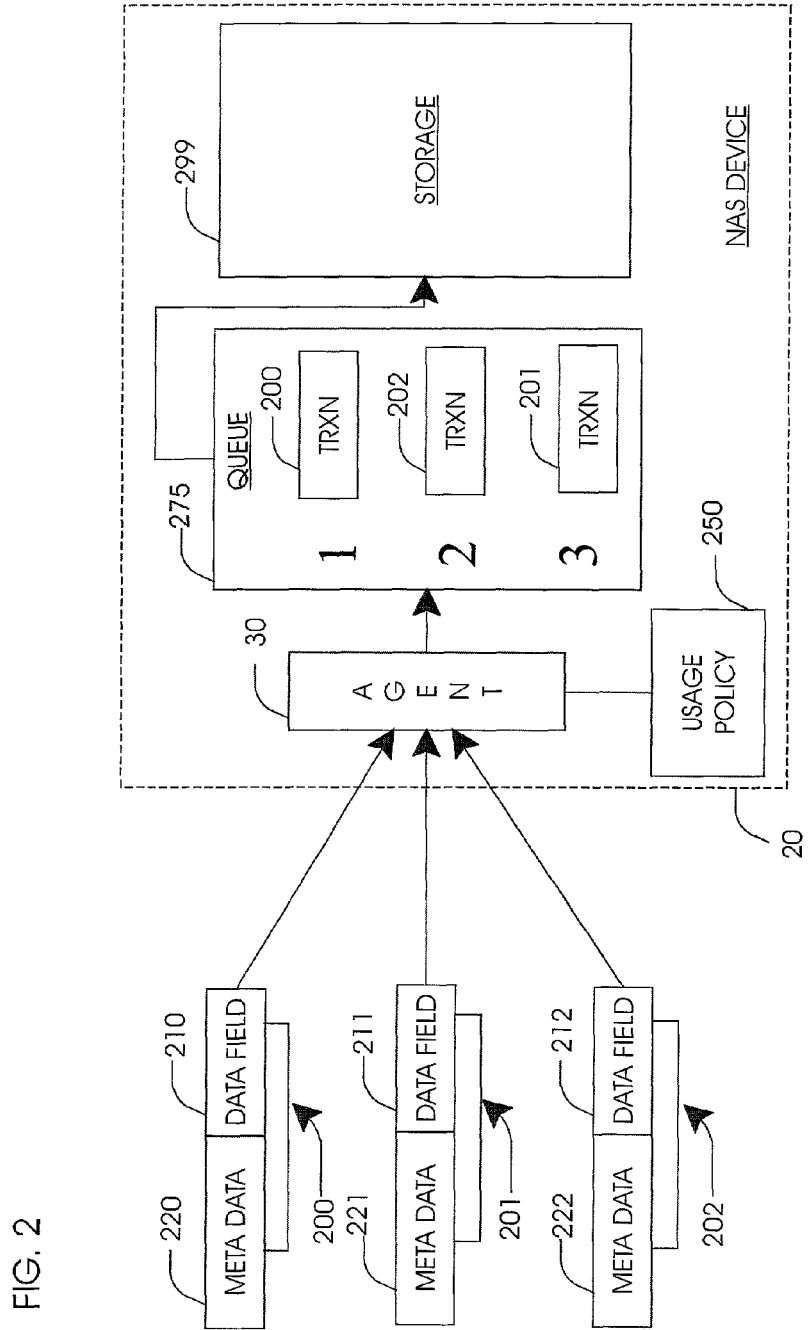
FIG. 2 illustrates prioritizing incoming transactions at a storage device based on a usage policy.
Figure 3:
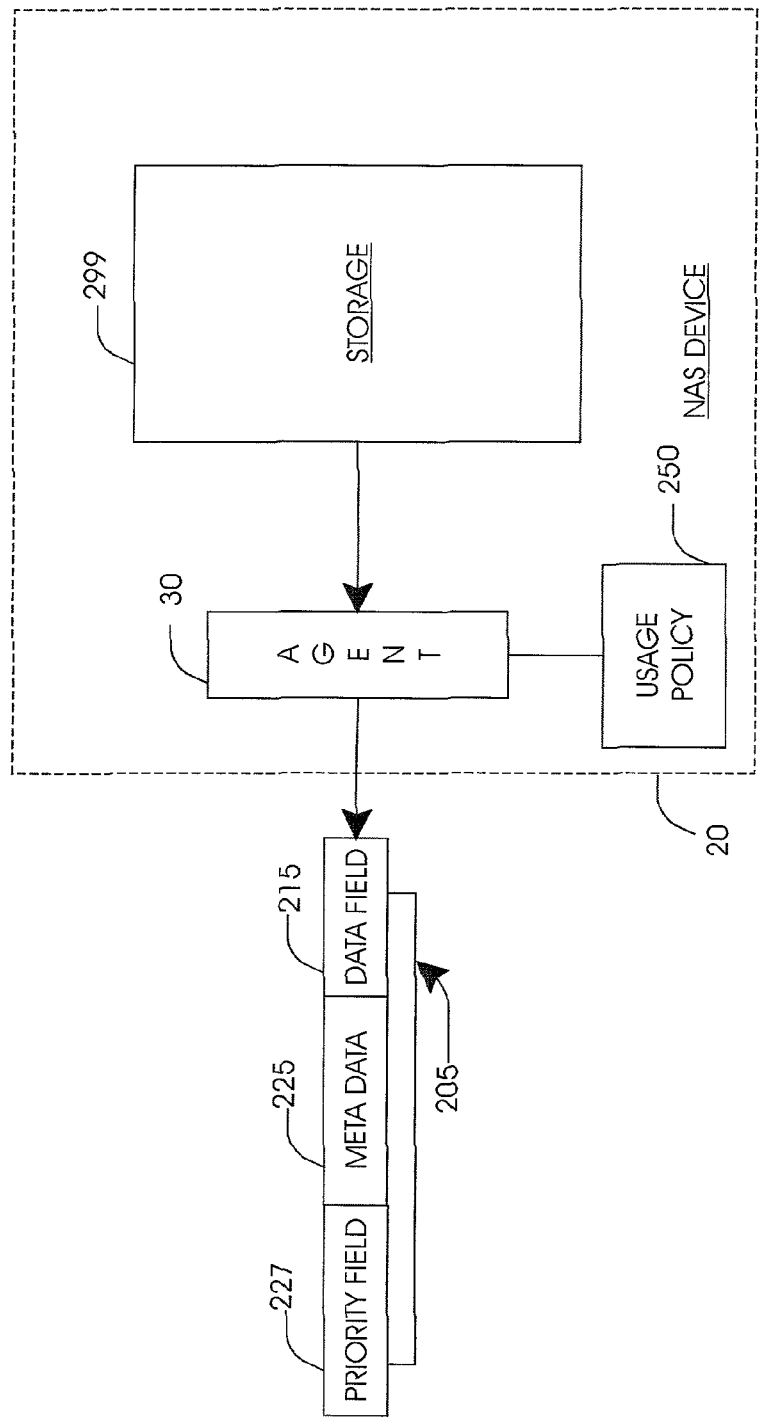
FIG. 3 illustrates prioritizing outgoing transactions at a storage device based on a usage policy.

FIG. 2 illustrates the agent 30 managing incoming transactions 200-202 at the NAS device 20 based on a usage policy 250. FIG. 3 illustrates the agent 30 managing one or more outgoing transactions 205 at the NAS device 20 based on a usage policy 250. It is understood that the usage policy 250 may be the same for incoming transactions 200-202 and for outgoing transactions 205, or a separate usage policy (not shown) may be provided for each. Although a queue is not shown for managing outgoing transactions 205, it is also understood that the same queue 275 may also be used for managing outgoing transactions 205, or a separate queue (not shown) may be provided for outgoing transactions 205. Alternately, a queue need not be used at all for outgoing transactions. For example, a queue need not be provided for outgoing transactions 205 where the outgoing transactions 205 are immediately placed onto the network 60 once a priority has been assigned and wherein the outgoing transactions 205 are handled according thereto only on the network.

Preferably, the usage policy 250 for each NAS device 20 on the network (e.g., WAN 60 and/or LAN 40) is generated at a single policy management server 80 and transmitted to the individual NAS devices 20-24, as discussed above with respect to FIG. 1. As such, management of the NAS device 20 is centralized without regard to individual vendors of the NAS devices 20. However, it is understood that the usage policy 250 can be defined in any suitable manner. For example, the usage policy 250 can be predefined (e.g., for a particular NAS device 20). Or for example, the usage policy 250 can be assembled at the policy management server 80 from various factors defined at one or more terminals 70. In addition, the usage policy 250 may be unique to and bundled with the NAS device 20, may be a generic usage policy 250 for each NAS device 20 on the network, may be defined for a cluster of NAS devices 20, etc.

Figure 4:
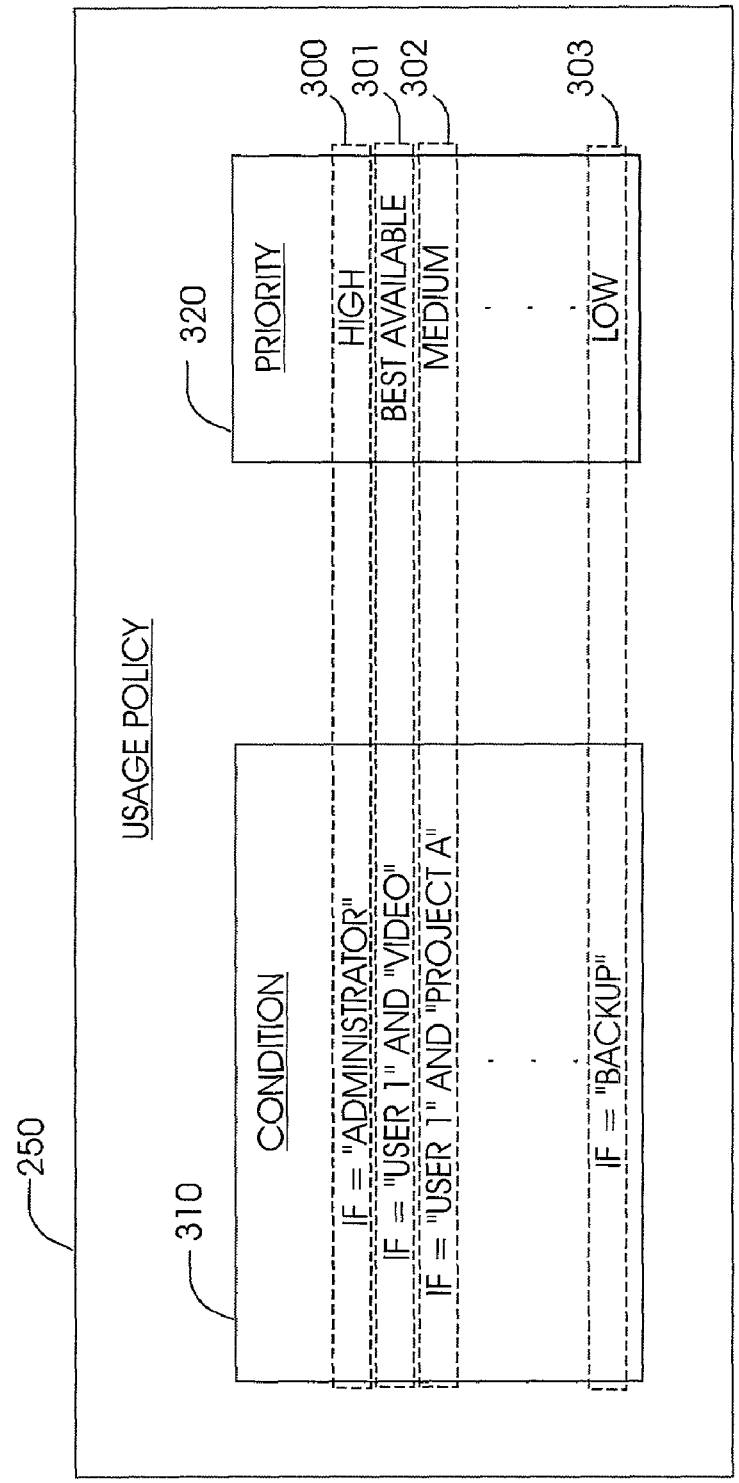
FIG. 4 is an example of one embodiment of a usage policy.

An exemplary usage policy 250 is shown in FIG. 4. The usage policy 250 defines a number of (i.e., one or more) rules 300-303 based on a condition 310 and a corresponding priority 320. When a transaction 200-202, 205 satisfies at least one of the conditions 310, the corresponding priority 320 may be assigned to the transaction 200-202, 205 (e.g., for access to the NAS device 20, or for routing over the network 60), as discussed in more detail below.

The transactions 200-202, 205 preferably include a data field 210-212, 215 and a meta data field 220-222, 225, such as a user ID, group ID, originating application, port, a target ID, etc., or a combination thereof. The transaction 200-202, 205 may comprise, for example, single-bit or multi-bit packets or fields, and may include any suitable meta data. Indeed, the transactions 200-202, 205 may even include a requested priority. In such an embodiment where the transactions 200-202, 205 includes a requested priority, the transactions 200-202, 205 can be routed based strictly on the requested priority, thus overriding the rules 300, based on a combination of factors (e.g., only where the user ID is "administrator", the rules 300 are overridden in favor of the requested priority), based on the priority of pending transactions 200-202, 205 (e.g., transactions already in the queue 275), etc.

It is understood that the meta data 220-222, 225 can be assigned to the transactions 200-202, 205 using suitable program code at the NAS device 20, the terminal 70 or elsewhere on the network (e.g., WAN 60, LAN 40), such as on a server (e.g., 50). For example, the program code may mark the transactions 200-202, 205 with a user ID, a project ID, a combination thereof, etc. As such, the agent 30 assigns a priority to the transaction 200-202, 205 when the meta data and/or the requested priority satisfies at least one of the conditions 310 defined in the usage policy 250 (e.g., based on an identified target). In any event, the agent 30 reads the meta data 220-222, 225 and determines whether any of the conditions 310 are satisfied. The agent 30 then assigns a corresponding priority 320 to the transactions 200-202, 205. The agent 30 may place the transactions 200-202, 205 into the queue 275 based on the assigned priority and relative to any other transactions 200-202, 205 pending in queue 275. Alternately, for outgoing transactions 205, the agent 30 may assign a corresponding priority 320 (e.g., in priority field 227) based on the rules 300-303 (e.g., based on the target) and place the outgoing transactions 205 onto the network 60 (i.e., for routing over the network 60 according to the assigned priority).

It is understood that the priority may be assigned to the transactions 200-202, 205 by the agent 30 in a designated priority field (e.g., field 227 on outgoing transaction 205), or otherwise (e.g., as part of the meta data). Alternately, for incoming transactions 200-202, the transaction itself need not be marked with a priority, and instead, the agent 30 may manage the priority of the transactions 200-202 using the queue 275.

It is also understood that the program code for marking the transactions 200-202, 205 may assign the meta data 220-222, 225 based on the user logon, the originating application, the time of day, a user-requested priority, the purpose for accessing the NAS device 20, etc. Likewise, the meta data may be assigned by an administrator, by a user, determined based on the originating application or originating terminal, a user ID, etc. In addition, the meta data may be any suitable indicator, such as a user ID, a directory, an application ID, a requested priority such as "urgent" or a scale value such as "seven" (e.g., on a scale of one to ten).

As an illustration of the invention, the incoming transactions 200-202 in FIG. 2 may include the exemplary meta data shown in Table 1.

TABLE 1

| TRANSACTION | META DATA |
|---|---|
| 200 | "Administrator" (220) |
| 201 | "Backup" (221) |
| 202 | "User1" AND "Project A" (222) |

The agent 30 receives the transactions 200-202 and reads the respective meta data from the packets 220-222. Table 2 shows the satisfied conditions 310 that are defined in the usage policy 250 (FIG. 4) and the transactions 200-202 that satisfy each of the conditions 310.

TABLE 2

| TRANSACTION | SATISFIED CONDITION |
|---|---|
| 200 | IF = "Administrator" |
| 201 | IF = "Backup" |
| 202 | IF = "User1" AND "Project A" |

As such, the corresponding priorities 320 defined in the usage policy 250 are assigned to the respective transactions 200-202 and the transactions 200-202 are placed in the queue 275 in the order of priority and granted access to the NAS device 20 in the same order, as shown in FIG. 2 and Table 3.

TABLE 3

| TRANSACTION | PRIORITY |
|---|---|
| 200 | High |
| 201 | Low |
| 202 | Medium |

For example, the transaction 200 is given the highest priority, placed first in the queue 275, and granted access to the NAS device 20 first (e.g., to the storage component 299 thereof), followed by transaction 202, which is followed by transaction 201. In addition, transactions currently being executed may be allowed to finish, or may be held and reprioritized based on the newly received transactions.

In another illustration, the ranking or position in the queue 275 is determined based on the target of the transaction 200-202. In this embodiment, the target may not only specify a NAS device 20 (e.g., by IP address), but also specify a particular portion of or partition on the NAS device 20 (e.g., directories "/video" and "/backup") or an associated storage device (e.g., 23 in FIG. 1). Thus, the agent 30 reads the meta data 220-222 (i.e., the target in this example) and places the transactions in the queue 275 based on the rules 300-303 (FIG. 3). For example, the following rules 300 may be defined in the usage policy 250:

IF target="/video" THEN Priority (320)="High"
IF target="/backup" THEN Priority (320)="Low"

Thus, where the transaction 202 has a target of "/video" and the data packet 201 has a target of "/backup", the transaction 202 is placed into the queue 275 by the agent 30 ahead of the transaction 201, as shown in FIG. 2.

In yet another illustration, the ranking or position in the queue 275 is determined by more than one parameter included in the meta data 220-222 (e.g., a user ID and a target) (FIG. 2). In addition, this illustration shows default handling of transactions 200-202 that do not specify any meta data. Again, the target also specifies a particular portion of or partition on the NAS device 20 (e.g., "/video", "backup", etc.) or an associated NAS device (e.g., 23 in FIG. 1). In addition, however, the transactions 200-202 include a user ID. Thus, the agent 30 reads both the user ID and the target and places the transactions 200-202 in the queue 275 based on the corresponding priority 320 defined by the rules 300 in the usage policy 250 (FIG. 3). For example, the following rules 300 may be defined in the usage policy 250:

IF Target="/video" AND User ID="User 1"
    THEN Priority (310)="High"
IF Target="/video" AND User ID="User 2"
    THEN Priority (310)="Best Available"
ELSE Priority="Medium"

Continuing with the example, the transactions (e.g., 200, 202) may each have a target of "/video" and user IDs of "user 1" and "user 2", respectively. In addition, one transaction (e.g., 201) may not specify either a target or a user (or if specified, it may fail to meet any of the conditions 310 defined in the usage policy 250). Thus, the transaction 201 is assigned a priority of "medium" by default. Therefore, the transaction 200 is placed into the queue 275 by the agent 30 ahead of the transaction 202, which is given priority over transaction 201, as shown in FIG. 2.

It is understood that the examples given above are merely illustrative of the invention. For example, the priority "best available" can be defined to give priority to one transaction over another transaction having a "low" or "medium" priority, or even assign it the highest priority of any transaction in the queue 275. Similarly, the corresponding priority can be defined as "high", "best available", etc. (e.g., as shown in FIG. 4), as scale values (e.g., "1" on a scale of one to ten where "ten" receives the highest priority), based on measurable parameters such as retrieve time (e.g., 15 msec), or any other suitable parameters. Furthermore, any suitable rules 300-303 can be defined in the usage policy 250, and may be more complex or more simple than those shown and described with respect to the exemplary usage policy 250 shown in FIG. 4. For example, a pass code may be included in the meta data that overrides the rules 300-303 and grants the highest priority to the corresponding transaction. Likewise, other default rules 300 (e.g., FIFO) can be defined to account for situations, such as, where a transaction satisfies more than one rule 300 or more than one transaction satisfies the condition 310. In addition, more than one set of rules 300 can be defined in the usage policy 250. Indeed more than one usage policy 250 can be used by the agent 30 to prioritize the transactions and can be accessed by the agent 30, for example, depending on the time of day, a hierarchy, etc. Such usage policies 250, rules 300, and conditions 310 therein, will depend on various design considerations.

It is also understood that the transactions need not arrive at the agent 30 simultaneously to be accorded the respective priority. For example, where the transaction 200 in the above examples arrives at the agent 30 after the transaction 202, the agent 30 may move the earlier queued transaction 202 so that the later arriving, but higher priority transaction 200 is moved ahead in the queue 275.

Furthermore, the agent 30 may assign a priority 227 to the outgoing transactions 205 similarly to that illustrated in the above examples, wherein the outgoing transactions 205 are handled on the network 60 according to the assigned priority 227. For example, the transactions 205 may be handled by one or more network components (e.g., a router, not shown) according at least in part to the assigned priority (e.g., using a queue at the network component). In addition, the outgoing transactions 205 may also be placed into an outgoing queue (not shown) at the NAS device 20 itself based on the assigned priority prior to being placed onto the network 60. The outgoing queue may be the same as that provided for incoming transactions 200-202, or an altogether separate queue specifically designated for outgoing transactions 205.

It is understood that the scope of the invention is contemplated to include: 1) assigning priority to only incoming transactions 200-202; 2) assigning priority to only outgoing transactions 205; and 3) assigning priority to both incoming transactions 200-202 and outgoing transactions 205.

Figure 5:
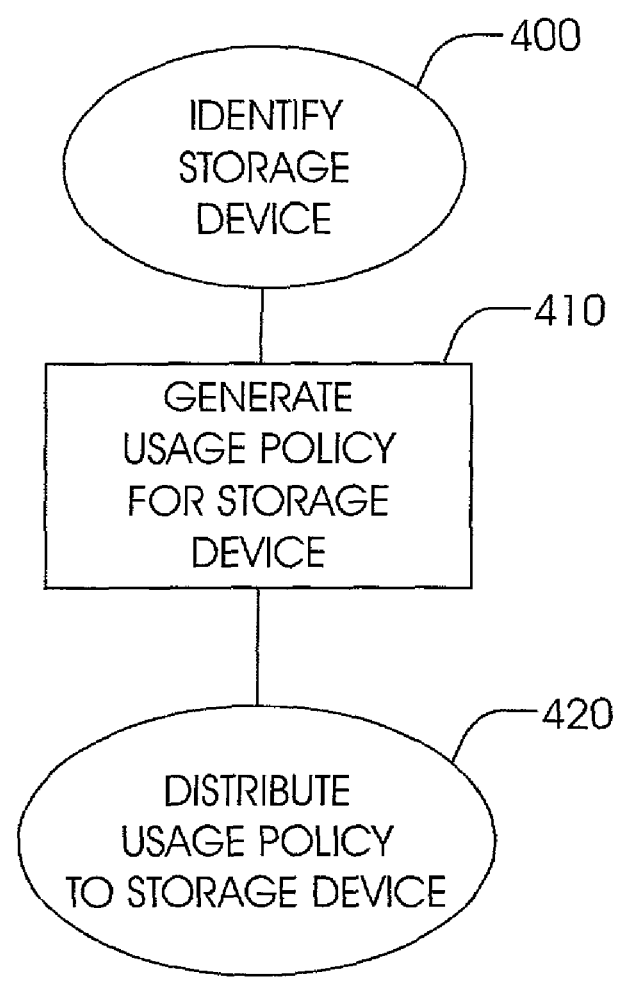
FIG. 5 is a flow chart showing steps for managing a network storage device according to one embodiment of the invention.

One embodiment of a method for managing a NAS device 20 according to the invention is shown in FIG. 5. In step 400, the NAS device 20 is identified (e.g., by IP address) on the network (e.g., WAN 60 and/or LAN 40). For example, the policy management server 80 can detect all devices on the network within a specified range of IP addresses using suitable program code for detection. Or for example, an administrator can manually enter the IP address of a particular NAS device 20 through the user interface 85 at the policy management server 80. In step 410, the usage policy 250 is generated at the policy management server 80. That is, the usage policy 250 can be defined by an administrator using the GUI 85. Alternatively, the usage policy 250 can be predefined. Or the usage policy 250 can be automatically generated. For example, a database of applications and corresponding predetermined priorities can be automatically combined (e.g., using suitable program code) with information contained in a database of applications installed at the terminals 70 to generate a usage policy 250. Preferably, a setup utility is provided for installing the program code for defining the usage policy 250 on the policy management server 80. Once generated, the usage policy 250 is distributed to the NAS device 20 in step 420. That is, the usage policy 250 is transmitted 90 via a standard protocol (e.g., using COPS over TCP) and stored at the NAS device 20 for use by the agent 30. Preferably, a setup utility is provided for installing the program code for prioritizing the transaction 200-202, 205 at the network storage device 20.

Figure 6:
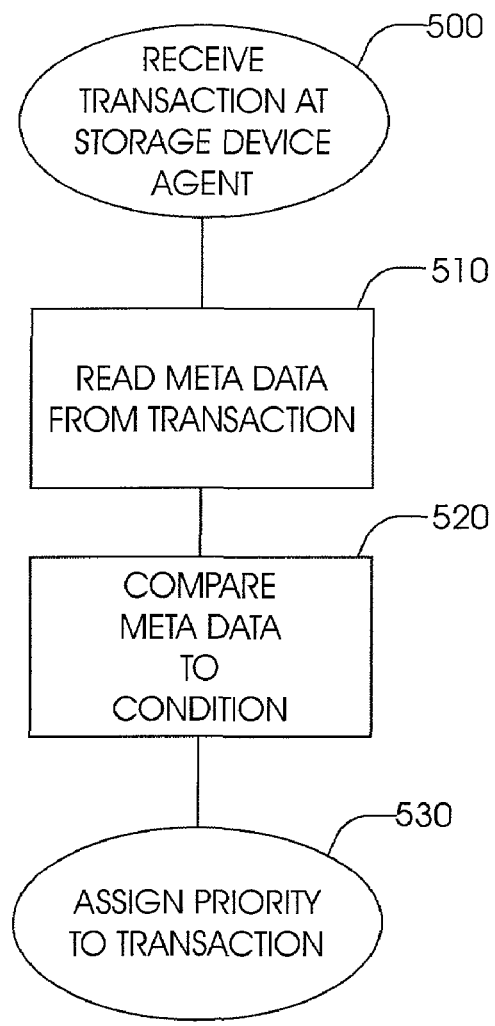
FIG. 6 is a flow chart showing steps for managing a network storage device according to another embodiment of the invention.

Another embodiment of a method for managing a NAS device 20 according to the invention is shown in FIG. 6. In step 500, a transaction 200-202, 205 is received at the NAS device 20 (e.g., from the network 60 or storage 299) by the agent 30 which reads the meta data 220-222, 225 from the transaction 200-202, 205 in step 510. In step 520, the agent 30 compares the meta data to the conditions 310 defined in the rules 300 in the usage policy 250. In step 530, the agent 30 assigns a priority 320 to the transaction 200-202, 205 based on the usage policy 250. For example, prioritizing the transaction may comprise ordering the incoming transaction 200-202 among other transactions in a queue 275 for access to storage at the NAS device 20, as explained above. Or for example, prioritizing the transaction may comprise assigning a priority to outgoing transactions 205 for handling at the NAS device 20 and/or elsewhere on the network 60.

It is to be understood that the steps shown in FIG. 5 and FIG. 6 need not be performed in the order shown. For example, a usage policy 250 can be generated (step 410) for a series of users that are to be added to the LAN 40, 41 and thereafter an available NAS device 20 can be identified (step 400) on which the generated usage policy 250 is to be implemented. Likewise, the invention also contemplates methods including fewer steps and methods including additional steps than those shown in FIG. 5 and FIG. 6. For example, a predefined usage policy 250 can be stored in memory at the policy management server 80 and assigned to the NAS device 20 without having to generate the usage policy 250 (step 410). Or for example, an additional step can be added for updating the usage policy 250 where a new user is added to the network, or to increase the priority of access for a particular user or terminal, etc. In addition, the one or more of the steps from FIG. 5 or FIG. 6 can be combined with the steps from the other figure.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A network storage device, comprising:
a non-transitory computer readable storage medium; and
non-transitory computer readable program code residing in said storage medium, including program code that is executed to:
receive an incoming transaction having a data field that includes a meta data field with data and a priority field with a requested priority;
define a usage policy that assigns a priority to the incoming transaction based on the data in the meta data field and that assigns priorities to outgoing transactions; and
override the priority based on the data in the meta data field with the requested priority included in the priority field of the incoming transaction.

2. The network storage device of claim 1, wherein said program code is further executed to:
read, by an agent in the network storage device, the data in the meta data field;
compare the data to conditions defined in a table having the usage policy; and
prioritize the incoming transaction based on a comparison of the data to the conditions in the table.

3. The network storage device of claim 1, wherein said computer readable program code further comprises program code for identifying said network storage device, and wherein said network storage device is a NAS device.

4. The network storage device of claim 1, wherein the priority based on the data in the meta data field is based on an application ID of an application originating the incoming transaction.

5. The network storage device of claim 1, wherein the meta data field includes both a user ID and a purpose for accessing the network storage device.

6. The network storage device of claim 1, wherein the priority based on the data in the meta data field includes a particular partition of the network storage device.

7. The network storage device of claim 1, wherein an agent in the network storage device assigns a priority to the incoming transaction based on the data in the meta data field.

8. A method for managing transactions at a network storage device, comprising:
receiving, at the network storage device, an incoming transaction having a data field that includes a meta data field with data and a priority field with a requested priority;
assigning, by an agent at the network storage device, a priority to the incoming transaction based on the data in the meta data field satisfying a condition of a usage policy; and
overriding, at the network storage device, the priority based on the data in the meta data field with the requested priority included in the priority field of the incoming transaction.

9. The method of claim 8 further comprising:
reading, by the agent, the data in the meta data field;
comparing the data to conditions defined in a table having the usage policy;
prioritizing the incoming transaction based on a comparison of the data to the conditions in the table.

10. The method of claim 8, wherein said priority based on the data in the meta data field includes an application ID of an application originating the incoming transaction.

11. The method of claim 8, wherein the priority based on the data in the meta data field includes both a user ID and a purpose for accessing the network storage device.

12. The method of claim 8, wherein the priority based on the data in the meta data field includes a particular partition of the network storage device.

* * * * *